United States Patent [19]

Narayana et al.

[11] Patent Number: 5,226,785
[45] Date of Patent: Jul. 13, 1993

[54] IMPELLER SYSTEM FOR A GAS TURBINE ENGINE

[75] Inventors: Anand D. Narayana; Richard L. Stanley, both of Loveland, Ohio

[73] Assignee: General Electric Company, Cincinnati, Ohio

[21] Appl. No.: 785,367

[22] Filed: Oct. 30, 1991

[51] Int. Cl.⁵ .............................................. F01D 5/06
[52] U.S. Cl. ...................................... 415/115; 416/95; 416/198 A
[58] Field of Search ................... 415/115, 116; 416/95, 416/96 R, 219 R, 220 R, 198 A, 204 R, 204 A, 193 A

[56] References Cited

U.S. PATENT DOCUMENTS

| | | | |
|---|---|---|---|
| 4,088,422 | 5/1978 | Martin | 416/198 A |
| 4,203,705 | 5/1980 | Wesbecher | 416/95 |
| 4,309,147 | 1/1982 | Koster et al. | 416/95 |
| 4,645,424 | 2/1987 | Peters | 416/198 A |
| 4,708,588 | 11/1987 | Schwarz et al. | 415/115 |
| 4,882,902 | 11/1989 | Reigel et al. | 60/39.75 |
| 4,884,950 | 12/1989 | Brodell et al. | 415/95 |
| 4,890,981 | 1/1990 | Corsmeier et al. | 416/220 R |

FOREIGN PATENT DOCUMENTS 860712  1/1971  Canada ............ 416/198 A

Primary Examiner—John T. Kwon
Attorney, Agent, or Firm—Jerome C. Squillaro; John R. Rafter

[57] ABSTRACT

An interstage thermal shield assembly for a gas turbine engine. The assembly includes an axially-extending thermal shield positioned between first and second stage disks to form a seal therebetween. The thermal shield includes complementary hook members shaped to engage slotted hook members formed on the first stage disk to form a bayonet connection, and complementary lip members for engaging lobe members formed on the second stage disk by virtue of split rings, thereby eliminating the need for a bolted connection between the thermal shield and disks and facilitating attachment and removal of the thermal shield. The thermal shield includes an annular impeller which is positioned rearwardly of the first stage disk, the impeller including bayonet connection with the disk which restrains the impeller from axial deflection, but permits radial deflection in response to thermal changes. The thermal shield also includes an annular bore, attached to and extending radially inwardly from the thermal shield, and rotating in a plane substantially normal to a rotational axis of the shaft mounting the disks. The bore is shaped to have a center of mass out of the plane of rotation, so that rotation of the bore creates a moment which urges the bore to deflect toward the upstream disk, thereby compensating for a pressure differential across the face of the bore as cooling air is pumped by the impeller radially outwardly toward the end of the first stage disk.

11 Claims, 5 Drawing Sheets

IMPELLER SYSTEM FOR A GAS TURBINE ENGINE

CROSS REFERENCES

This case is related to the following co-pending patent applications having U.S. Ser. No. 07/785,598 and U.S. Ser. No. 07/785,356, filed concurrently herewith.

BACKGROUND OF THE INVENTION

The present invention relates to gas turbine engines and, more particularly, to thermal shield assemblies for gas turbine engines which include cooling elements for conveying air to one or more disk assemblies.

In a gas turbine engine of the type used in jet aircraft applications, first and second stage turbine disks support turbine blades which require air cooling under normal operating conditions. This is accomplished by pumping air into a confined space or cavity between the first and second stage disks, then directing the air from that space to passageways formed in the turbine blades themselves.

This interstage cavity is defined by the first and second stage disks, the shaft on which they are mounted and a thermal shield, which is located radially outwardly of the shaft. The thermal shield is generally cylindrical in shape and is attached at its ends to the first and second stage disks. Typically, the thermal shield is bolted to the disks. However, a disadvantage with such a bolted connection is that it does not allow for expansion and contraction of the thermal shield relative to the disks in response to thermal changes. This rigid connection therefore creates high thermal stress concentrations in the thermal shield which significantly shorten the useful life of the shield. Further, such bolted connections, which may require as many as 80 bolts per disk, are time consuming to secure.

Similarly, the thermal shield assembly typically includes a spacer impeller which extends between the first and second stage disks and is being bolted at its radially-inner periphery to the second stage disk, and at its radial outer periphery to the first stage disk. The spacer impeller is formed by two juxtaposed disks which are divided by ribs into a plurality of spoke-like, radially-extending passageways. The impeller ducts cooling air in the chamber radially outwardly and forwardly toward the first stage disk which would otherwise follow a pressure gradient favoring the second stage disk.

A disadvantage with this type of disk impeller structure is that the bolted connections at the inner and outer peripheries do not allow for the expansion and contraction of the impeller relative to the first and second stage disks.

The thermal shield assembly also includes an annular, disk-shaped bore which is connected to and extends radially inwardly from the thermal shield adjacent the spacer impeller. The bore is required in order to add hoop strength to the shield to prevent buckling and other deformation of the shield during operation of the turbine engine.

A disadvantage of such bore designs is that pressure gradients within the area bounded by the thermal shield between the first and second stage disks causes the bore to deflect rearwardly toward the second stage disk, thereby bending the thermal shield.

Accordingly, there is a need for a thermal shield assembly which is connected to the first and second stage disks such that expansion and contraction of the thermal shield and spacer impeller resulting from thermal stresses relative to the first and second stage disks is minimized. Further, there is a need for a thermal shield assembly in which the thermal shield bore resists deformation in response to pressure gradients without adding expensive and relatively heavy reinforcing members.

SUMMARY OF THE INVENTION

The present invention is a thermal shield assembly which may be attached to the first and second stage disks, or removed therefrom, quickly and easily. Further, the shield assembly is connected to the first and second stage disks without positive interlocking mechanisms, such as bolts, so that relative thermal expansion and contraction between the thermal shield and disks is permitted without creating excessive thermal stresses which might otherwise shorten the useful life of the shield assembly.

The forward periphery of shield assembly includes complementary hook members which interlock with slotted hook members formed in a rearward face of the first stage disk. The interlocking hook members form a bayonet-type connection which prevents movement of the shield in axial and radial directions.

The rear periphery of the thermal shield is connected to the second stage disk by a split ring assembly, and includes a plurality of slotted tabs which engage lobes projecting forwardly from the second stage disk. The interengagement of the lobes and tabs prevents rotational movement of the shield relative to the disks, thereby preventing the unintended disengagement of the bayonet-type connection with the first stage disk. The split ring assembly prevents radially-outward movement of the rear portion of the shield, and the split ring bears against the lobes to prevent axial movement in a forward direction.

The thermal shield assembly also includes a radially-extending, annular bore which lies substantially in a plane perpendicular to the rotational axis of the compressor shaft. However, the inner periphery of the bore is shaped to provide a center of mass which is displaced rearwardly from this plane, so that when the bore rotates with the disks, a moment is created which forces the bore forwardly. This moment force is of a magnitude sufficient to counteract an opposing force resulting from a pressure gradient acting against the forward face of the bore which results from the flow of cooling air within the volume defined by the thermal shield.

The thermal shield assembly also includes a double walled impeller which is bolted to the stage one disk at its inner periphery and is connected to the stage one disk adjacent to its outer periphery by a bayonet-type connection. This connection allows relative expansion and contraction of the impeller disk in response to thermal changes relative to the stage one disk to which it is connected. The impeller includes a plurality of radially-extending air passages which are angled forwardly to direct cooling air into the volume between the disks forwardly to the route of the stage one blades. Air so conveyed by the impeller is prevented from flowing rearwardly by a discourager seal formed by an annular ring extending radially outwardly from the impeller and overlapping a corresponding annular ring extending radially inwardly from the thermal shield.

Accordingly, it is an object of the present invention to provide a thermal shield assembly which provides for boltless connection to the first and second stage disks of the turbine portion of a gas turbine engine to minimize stress concentrations and to promote the relative expansion and contraction of the shield assembly; a thermal shield assembly which includes a thermal shield that is connected by a bayonet-type connection to the first stage disk and by a meshing engagement to the second stage disk so that relative rotation of the thermal shield is prevented, as well as radial and axial deflection; a thermal shield having an annular bore which resists deflection resulting from pressure gradients within the thermal shield area; a thermal shield assembly which includes an impeller for directing cooling air forwardly to the first stage impeller blades; and a thermal shield assembly which is relatively easy to install and remove from an engine.

Other objects and advantages of the present invention will be apparent from the following description, the accompanying drawing and the appended claims.

DETAILED DESCRIPTION

Figure 1:
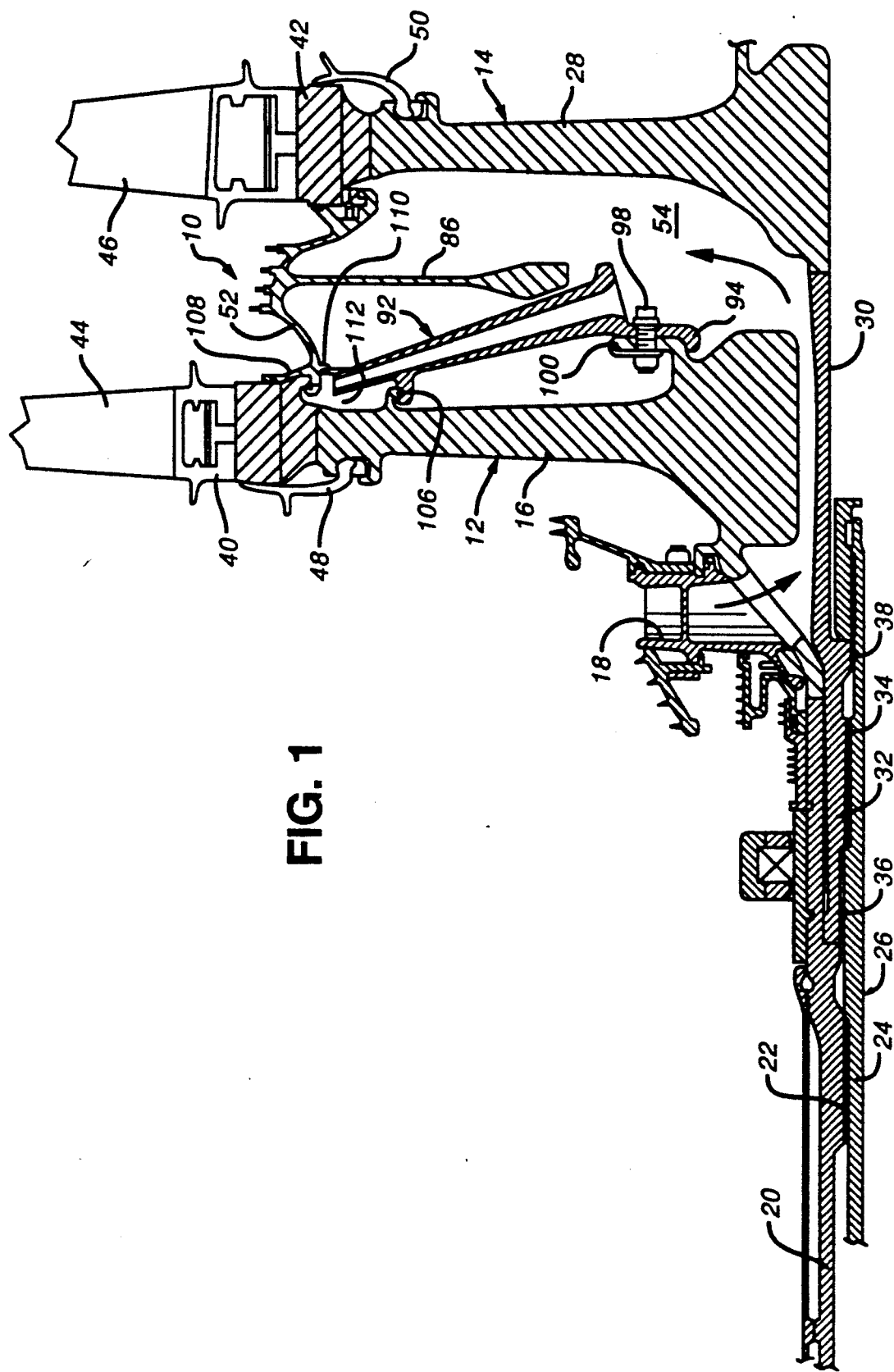
FIG. 1 is a side elevation in section of the thermal shield assembly of the present invention, shown splined to a compressor shaft.

As shown in FIG. 1, the thermal shield assembly, generally designated 10, is attached to and extends between first and second stage disk assemblies 12, 14, respectively, of a gas turbine engine. Disk assembly 12 includes a disk member 16 having a cooling air mini-nozzle 18 and a cylindrical sleeve 20. Sleeve includes a spline 22 which engages a complementary spline 24 of a compressor shaft 26.

Second stage disk assembly 14 includes disk member 28 having cylindrical sleeve 30 which includes a spline 32 that meshes with a spline 34 of shaft 26. Sleeve 30 includes pilots 36, 38 which engage the shaft forwardly and rearwardly of the spline 32. The first and second stage disk assemblies 12, 14 include slotted rims 40, 42, respectively, which receive turbine blades 44, 46, respectively in a dovetail fit. Blades 44, 46 are retained within their respective slotted rims 40, 42 by boltless blade retainers 48, 50. The structure of the blade retainers 48, 50 is more fully described in Corsemier et al. U.S. Pat. No. 4,890,981, the disclosure of which is incorporated herein by reference. The disks 12, 14 have 80 and 74 blades 44, 46, respectively, in the embodiment shown; however, the invention 10 will function with turbine disks of any number of blades.

Figure 4:
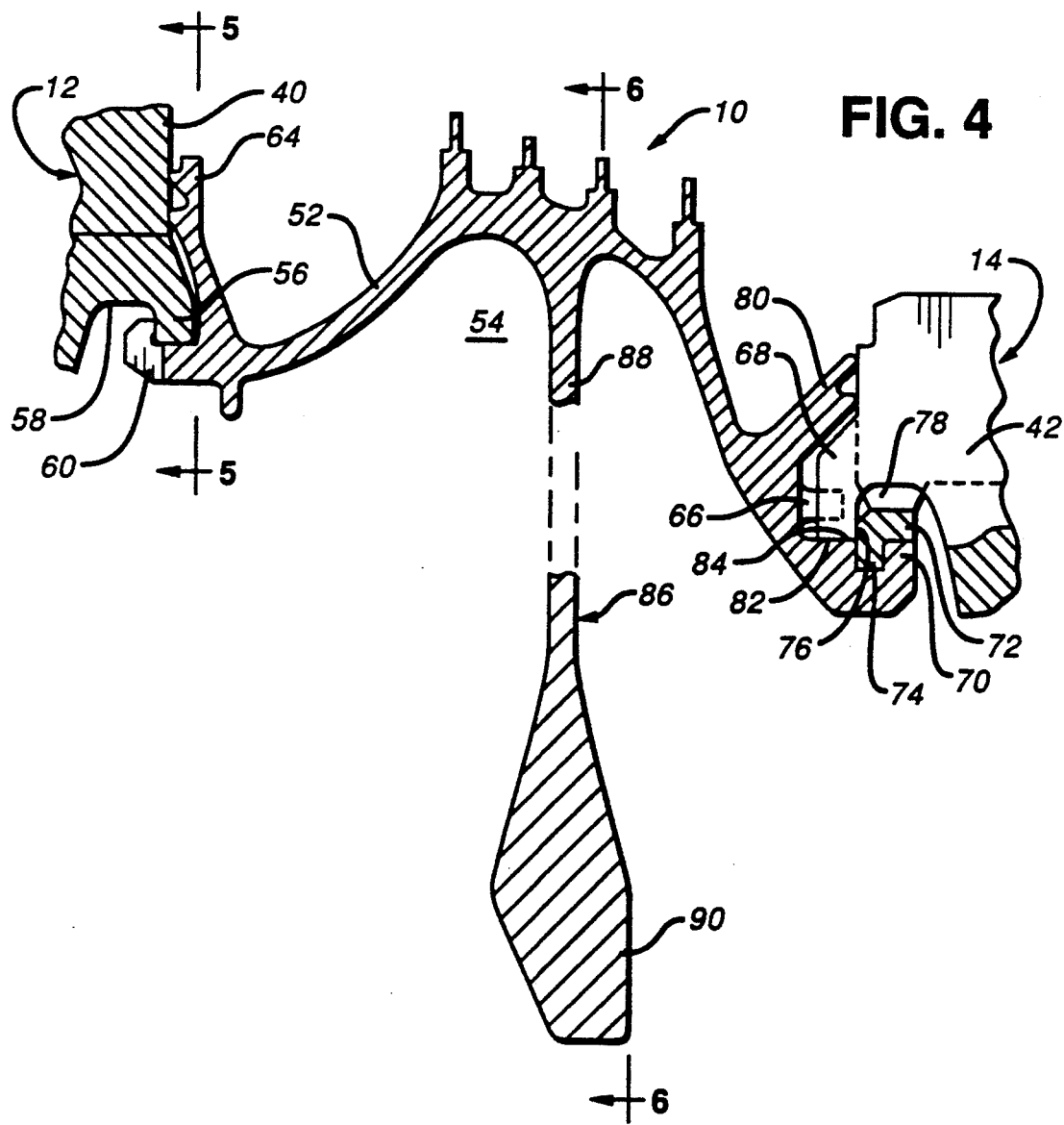
FIG. 4 is a detail side elevation in section of the thermal shield and bore of the assembly of FIG. 1, in which the bore is partially broken away.

As shown in FIG. 4, the shield assembly 10 includes a substantially cylindrical shield member 52 (see also FIG. 1) which extends between the first and second stage disk assemblies and defines a volume 54 which receives cooling air from mini-nozzle 18. The blades 44, 46 include internal passageways (not shown) which are in fluid communication with the volume 54. During operation of the associated engine, cooling air is drawn through the conduit 18 into the volume 54, where it flows to the blades 44, 46.

The rear face of the first stage disk assembly 12 includes downwardly depending slotted hook elements 56 which protrude from an undercut 58. The shield member 52 includes upwardly extending, complementary hook fingers 60 which engage the forward-facing portions of the hook elements 56.

Figure 5:
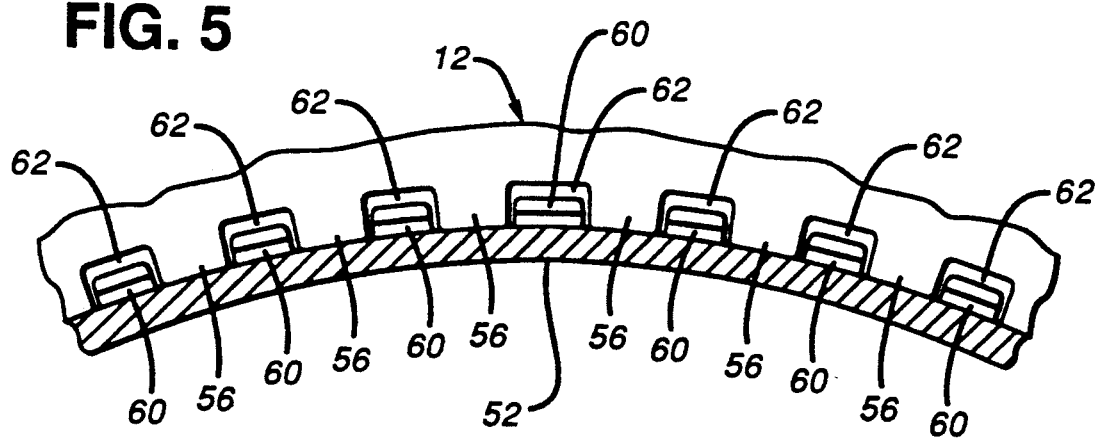
FIG. 5 is a detail taken at line 5—5 of FIG. 4, in disengaged position.

As shown in FIG. 5, the hook elements 56 are spaced to form slots 62 of sufficient width to receive the hook fingers 60. Consequently, the shield element 52 is attached to the first stage disk assembly by a bayonet-type connection formed by the engagement of hook elements 56 and fingers 60. To attach the shield member 52 to the disk 12, the thermal shield 52 is positioned so that the fingers 60 are in registry with the slots 62, then advanced toward the first stage disk until the hook fingers pass through the slots 62, then rotated until the hook fingers 60 pass in front of the hook elements 56 within the undercut 58.

The forward portion of the shield member 52 also includes an annular retaining arm member 64 which bears against the slotted rim 40 of the first stage disk assembly 12. The retaining arm 64, in combination with the bayonet interlocking connection between the hook fingers 60 and slotted hook elements 56, prevents movement of the forward portion of the shield member 52 in both axial and outward radial directions.

The shield member 52 includes a plurality of rearwardly extending tabs 66 which are interposed in locking engagement in between a plurality of forwardly-projecting lobe members 68, integral with the slotted rim 42 of second stage disk assembly 14. The shield member 52 includes a radially-outwardly extending annular lip 70 which captures a four-piece split ring 72. Ring 72 includes a radially-inwardly extending portion 74 which engages both the lip 70 and a rearward face 76 of the lobe elements 68. The ring 72 is held in place by radially-inwardly extending blade pads 78 (see FIG. 4), which are integral with blades 46 (see FIG. 1). Shield member 52 also includes a radially-outwardly extending retainer arm 80 which bears against a forward face of slotted rim 42. The lobe member 68 includes an inwardly-facing rabbet face 82 which bears against outwardly-facing rabbet face 84 of the shield member 52.

Consequently, the rear portion of the shield member 52 is constrained from outward radial movement by the engagement of the lip 70 with split ring 72 and blade pad 78 as well as the rabbet engagement of surfaces 84 and 82 of the shield and lobe member, respectively. Axial movement of the shield member 52 adjacent to the second stage disk 14 is constrained by engagement of the arm 80 and slotted rim 42 as well as the interengagement of lip 70, split ring 72 and rear face 76 of the lobe 68. Further, once the forward portion of the shield member 52 has been locked into engagement with the first stage disk assembly 12, relative rotational movement between the first stage disk and shield is prevented by engagement between the tabs 66 and lobe members 68 of the second stage disk assembly. Since the first and second stage disk assemblies are both splined to a common turbine shaft 26 (see FIG. 1), relative rotation of the disk assemblies is prevented.

Figure 6:
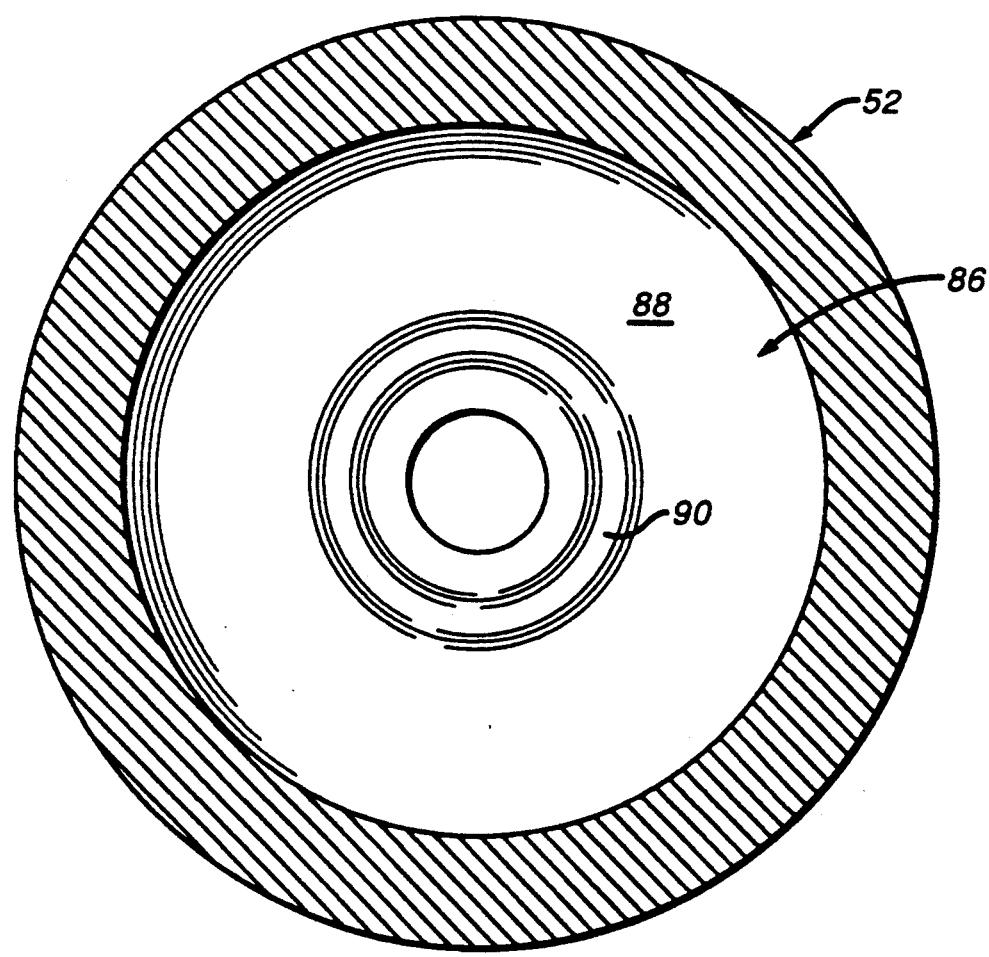
FIG. 6 is a rear elevation of the bore taken at line 6—6 of FIG. 4.
Figure 7:
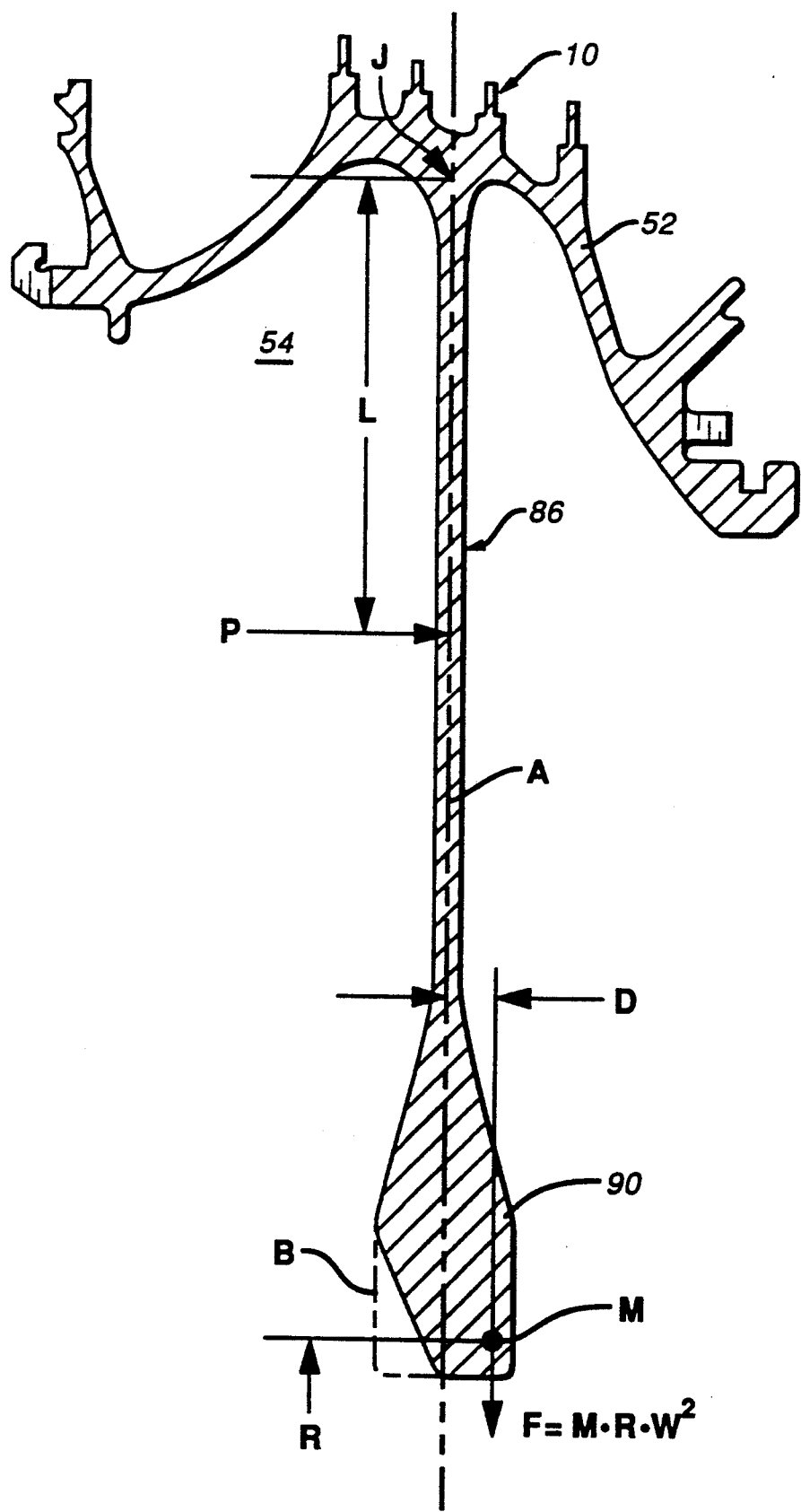
FIG. 7 is a detail side elevation in section of the thermal shield of FIG. 4, showing the bore in full.

As shown in FIGS. 4, 6 and 7, the shield assembly 10 includes a disk-shaped bore 86 which includes an axis of symmetry A that lies in a plane which is normal to the compressor shaft 26 (see FIG. 1). The bore 86 is connected at its outer periphery to the thermal shield 52 and includes a relatively flat central portion 88 and a thickened hub portion 90. As shown in FIG. 7, when the shield assembly 10 is rotated and the assembly is accelerated with the associated engine, a pressure gradient exists which extends from front to rear within the volume 54, and therefore acts upon the bore 86. The pressure resultant is a force P acting on the bore a distance L from the junction J between the bore and the shield member 52. This creates a bending moment of magnitude PL on the bore which causes it to deflect rearwardly from the position shown in FIG. 7.

However, the hub 90 is asymmetric with respect to the axis A since the portion B denoted by broken lines has been removed from the forward face of the asymmetric hub. As a result, the center of mass M of the hub is offset from the axis A a distance D.

When the bore 86 is rotated with the thermal shield assembly 10, this offset creates a force F which equals the product of $M \cdot R \cdot \omega^2$ where R is the radial location of the center of mass of the asymmetric hub 90 and $\omega$ is the angular velocity of asymmetric hub 90. This force F acts on the bore 86 at a distance R, which is the radial distance from the center of mass M to the junction J.

The magnitude of the force F is such that the product FD, which acts counter to the moment PL, is substantially equal in magnitude to moment PL and thereby cancels the bending moment. An advantage of this design is that the magnitude of the moment FD will increase proportionately with the rotational speed of the thermal shield assembly 10, and this increase should remain approximately equal to the bending moment PL, resulting from the pressure force against the bore 86, which also increases with the rotational speed of the thermal shield assembly 10. Consequently, the bore 86 remains substantially undeflected throughout the entire range of engine speeds, without need of additional reinforcing structure. The inherent hoop strength of the bore 86 is sufficient to prevent deflection along the radius of the bore.

As shown in FIG. 1, the shield assembly 10 also includes a disk-shaped impeller, generally designated 92, which is attached to the first stage disk assembly 12 and is angled forwardly toward the slotted rim 40. The impeller 92 includes at its inner periphery a rabbetted flange 94 which includes a plurality of bolt holes 96 (see also FIG. 2) that receive mounting bolts 98 to connect the flange to a mating flange 100 which extends radially outwardly from the hub of the disk assembly 12.

Figure 8:
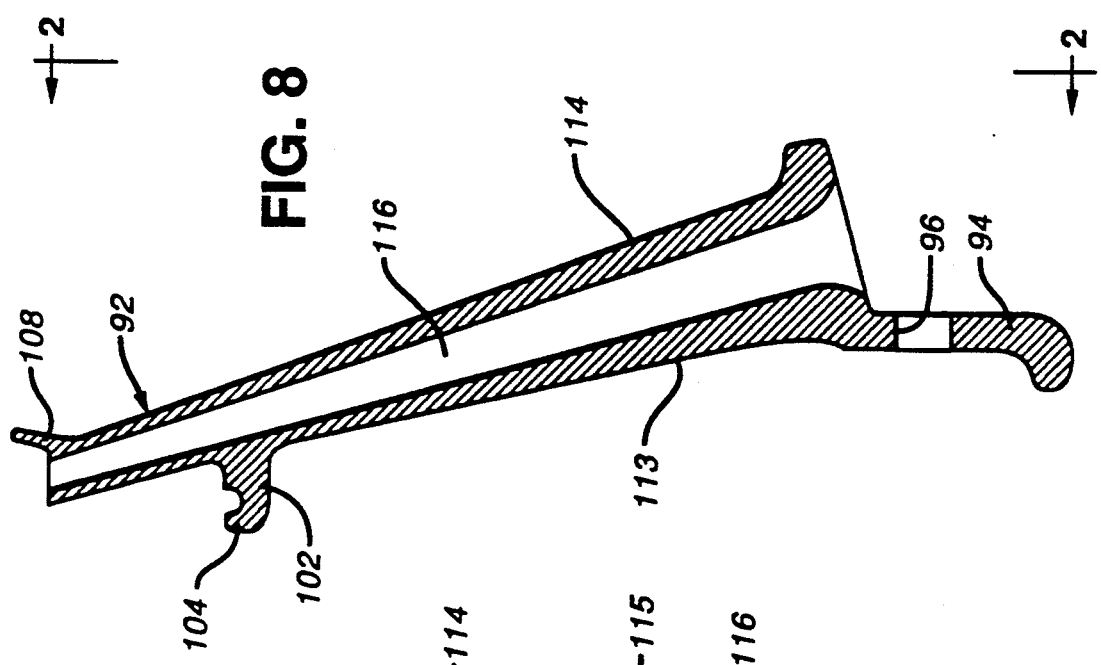
FIG. 8 is a detail side elevation in section of the impeller of FIG. 2.

As shown in FIG. 8, the impeller 92 includes a forwardly projecting flange 102 adjacent its outer periphery which includes a plurality of spaced fingers 104. The fingers 104 engage correspondingly-spaced, downwardly depending fingers 106 extending from the first stage disk assembly, so that the fingers interlock in a bayonet-type fit similar to the connection between thermal shield member 52 and hook elements 56 (see FIG. 5).

The impeller 92 includes an outer peripheral ring 108 which overlaps to a radially-inwardly extending ring 110 formed on the shield member 52, as shown in FIG. 1. Rings 108, 110 form a discourager seal to prevent rearward flow of air from the region 112 between the impeller and the first stage disk 12.

Figure 2:
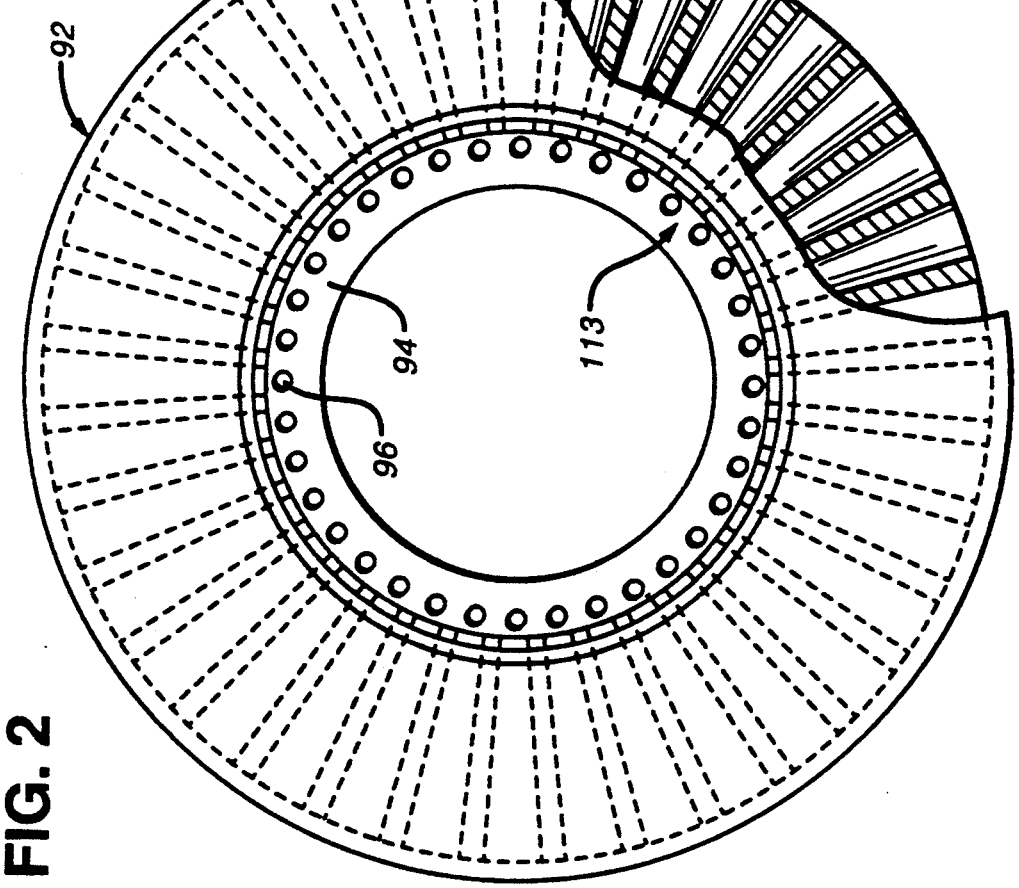
FIG. 2 is a rear elevation of an impeller of the assembly of FIG. 1, partially broken away, taken at line 2—2 of FIG. 8.
Figure 3:
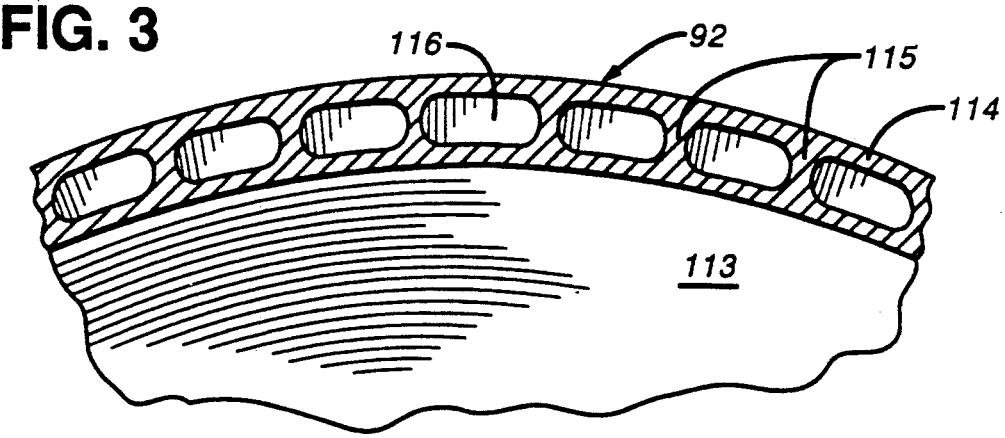
FIG. 3 is a detail showing the outer periphery of the impeller of FIG. 2.

As shown in FIGS. 2, 3 and 8, the impeller 92 includes forward and rearward annular disk portions 113, 114 separated by spoke-like dividers 115. The dividers 115 form a plurality, preferably 40, of radially-extending passages 116 which convey cooling air from the region of the volume 54 adjacent to the turbine shaft 26 outwardly and forwardly to the blade slotted rim 40, where the cooling air enters the passages (not shown) in blade 44. The passages preferably are in registry with the slotted rim 40. The impeller cross section, shown best in FIG. 8, is conical and the passages 116 decrease in width in an axial direction as the passages progress radially outwardly. Conversely, as shown in FIG. 2 the air passages 116 are wider, in a tangential direction, at the outer periphery of the impeller 92 than at the inner periphery. This maintains a relatively constant volume for the cooling air, and constant thickness for spoke-like dividers 115. The impeller disks 113, 114 are thickened at their inner peripheries to bear increased hoop stress at that area.

As a result of the bayonet connection between the flange 102 and the fingers 106 of the first stage disk 12, the impeller 92 can expand and contract in response to thermal stresses relative to the disk 12 without creating stress concentrations at the point of connection at the outer periphery. At the same time, the impeller 92 is prevented from axial and radial movement by the bayonet connection.

Attachment of the impeller 92 to the disk assembly 12 is accomplished by placing the impeller adjacent to the rear face of the disk assembly so that the fingers 106, 104 mesh, then rotating the impeller relative to the disk. This effects the bayonet locking connection and, at the same time, places holes 96 in registry with the corresponding holes of the flange 100. The impeller is then bolted to the disk. Removal of the impeller 92 from the disk 12 is accomplished simply by reversing the aforementioned steps.

In conclusion, the thermal shield assembly 10 includes the major components of a shield member 52 and impeller 92, both of which are attached to the first stage disk 12 by bayonet-type connections instead of exclusively bolted connections used in prior art devices, thereby permitting slight relative movement of these components n response to thermal changes. The bayonet-type connections are secured since, with both components 52, 92, the rearward portions are connected by means which prevent relative rotation of those components with respect to the disk 12. Further, the bore 86 is constructed so that it resists the bending moment created by the pressure differential across the face of the bore in a manner which minimizes the amount of material needed to construct a non-deflecting bore and eliminates the need for structural ribs or gussets which add to the weight of the engine and would obstruct air flow within the volume 54.

While the form of apparatus herein described constitutes a preferred embodiment of this invention, it is to be understood that the invention is not limited to this precise form of apparatus, and that changes may be made therein without departing from the scope of the invention.

What is claimed is:

1. An impeller system for use with a gas turbine engine of a type having a first stage disk mounted on a rotating turbine shaft, the system comprising:

annular impeller means positioned rearwardly of said first stage disk about said shaft and including means for securing said impeller means at a base thereof to said disk; and interlocking means, extending between said impeller means and said disk, positioned radially outwardly of said securing means, whereby said impeller is restrained from axial deflection, but permitted radial deflection in response to thermal changes; and wherein said securing means comprises a plurality of bolts.

2. The system of claim 1 wherein said impeller means includes a plurality of radially-extending passages extending therethrough, wherein said passages are angled axially forwardly to route cooling air to a plurality of blades attached to said first stage disk.

3. The system of claim 2 wherein said passages taper outwardly such that cross sectional areas thereof increase in radially outward direction.

4. The system of claim 1 wherein said interlocking means comprises a bayonet-type mount.

5. The system of claim 4 wherein said bayonet-type mount includes a plurality of fingers extending rearwardly from and spaced about said first stage disk, and an annular flange extending about a forward face of said impeller means and shaped to receive said fingers.

6. The impeller of claim 5 wherein said flange includes radially-outwardly extending complementary fingers; and said fingers on said disk are spaced to receive said complementary fingers therebetween.

7. The system of claim 1 further comprising flow restricting means.

8. The system of claim 7 wherein said flow restricting means includes an annular ring extending radially from an outer periphery of said impeller means and positioned adjacent to an annular ring formed on an associated thermal shield.

9. An impeller system for use with a gas turbine engine of a type having a first stage disk mounted on a rotating turbine shaft, the system comprising:

annular impeller means positioned rearwardly of said first stage disk about said shaft and including means for securing said impeller means at a base thereof to said disk; and interlocking means, extending between said impeller means and said disk, positioned radially outwardly of said securing means, whereby said impeller is restrained from axial deflection, but permitted radial deflection in response to thermal changes; and wherein said impeller means include first and second disk portions.

10. The system of claim 9 wherein said impeller means includes dividers extending between said disk portions, said disks and dividers forming said passages.

11. In a gas turbine engine having first and second stage disk means for mounting turbine blades, an annular thermal shield connecting said disk means, and disk-shaped impeller means, bolted adjacent a radially inner periphery thereof to a base of said first stage disk means, the improvement comprising:

said first stage disk means and said impeller means having interlocking means extending therebetween and located adjacent a periphery of said impeller for restraining deflection of said impeller means in an axial direction, but permitting radial expansion of said impeller means in response to thermal changes.

* * * * *